June 14, 1966
J. J. ABELL
3,256,121
METHOD OF MAKING A REINFORCED POROUS
AND PERMEABLE SHEET MATERIAL
Filed Sept. 5, 1962
2 Sheets-Sheet 1
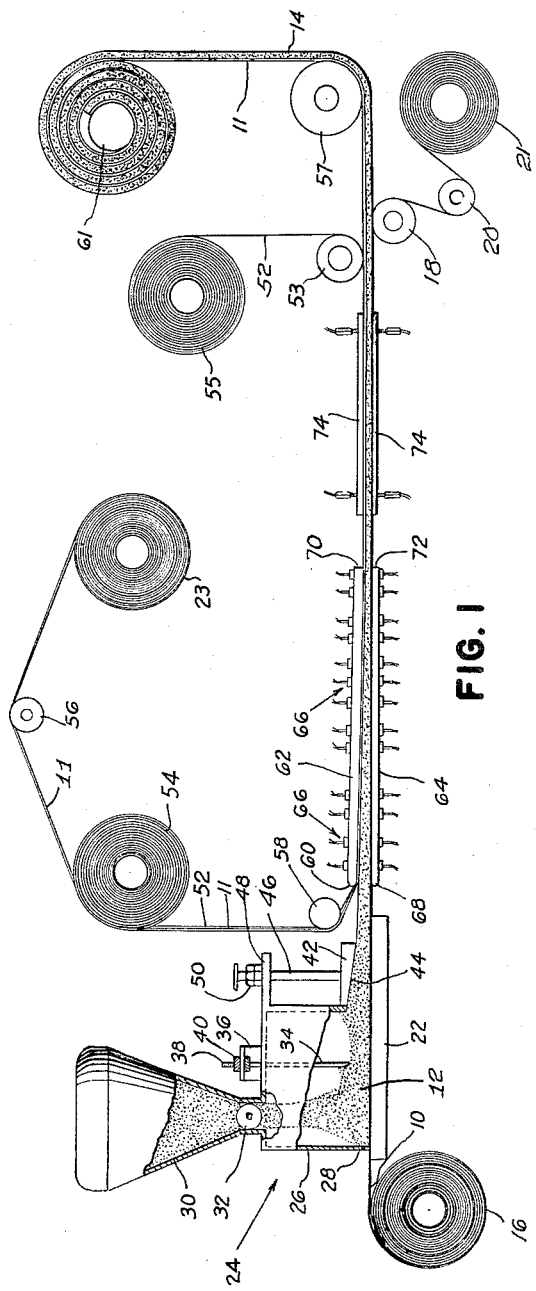
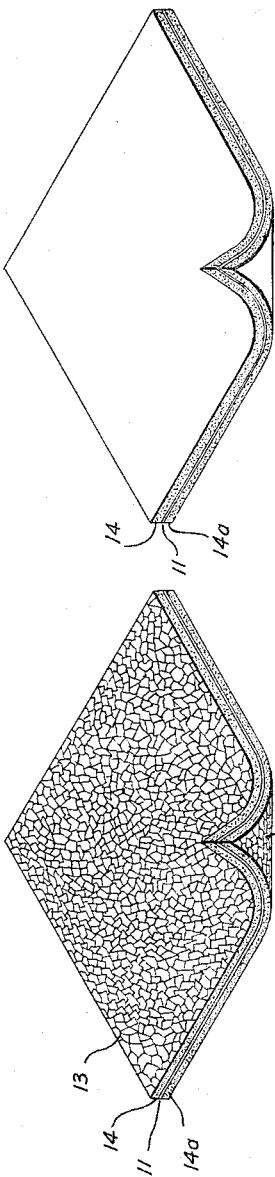
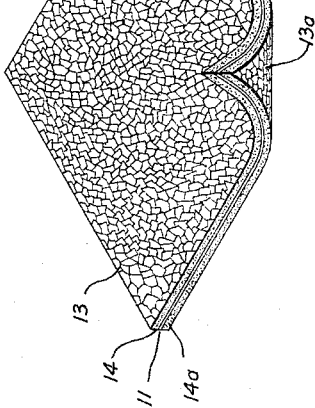
INVENTOR.
J. J. Abell
BY
Robert P. Churchill
ATTORNEY June 14, 1966  J. J. ABELL  3,256,121
METHOD OF MAKING A REINFORCED POROUS
AND PERMEABLE SHEET MATERIAL
Filed Sept. 5, 1962  2 Sheets-Sheet 2

INVENTOR.
J. J. Abell

BY Robert Churchill
ATTORNEY

3,256,121
METHOD OF MAKING A REINFORCED POROUS AND PERMEABLE SHEET MATERIAL
Jerrold J. Abell, Putnam, Conn., assignor to Rogers Corporation, Rogers, Conn., a corporation of Massachusetts
Filed Sept. 5, 1962, Ser. No. 221,554
6 Claims. (Cl. 156—62.2)

This invention relates to reinforced porous and permeable sheet material and to the method of making the same.

The invention has for an object to provide a novel and improved reinforced porous permeable sheet material embodying a fibrous reinforcing sheet secured between permeable porous plastic layers.

The invention has for an object to provide a novel and improved method of manufacturing a porous plastic sheet material of the type illustrated and described in the United States Patent to Walter W. Yarrison, Patent No. 3,067,469, the improvement comprising a method of applying a porous permeable layer to both sides of a permeable reinforcing or interlining sheet in a novel and efficient manner.

With this general object in view and such others as may hereinafter appear, the invention consists in the reinforced porous permeable sheet and in the method of manufacturing the same as hereinafter described and particularly defined in the claims at the end of this specification.

In the drawings illustrating the preferred embodiment of the invention:

FIG. 1 is a diagrammatic view in side elevation of a preferred form of apparatus for use in practicing the present invention and illustrating one step in the manufacture of a composite sheet in accordance with the present invention;

FIGS. 3 and 4 are perspective views of composite sheets produced in accordance with the present method.

Figure 2:
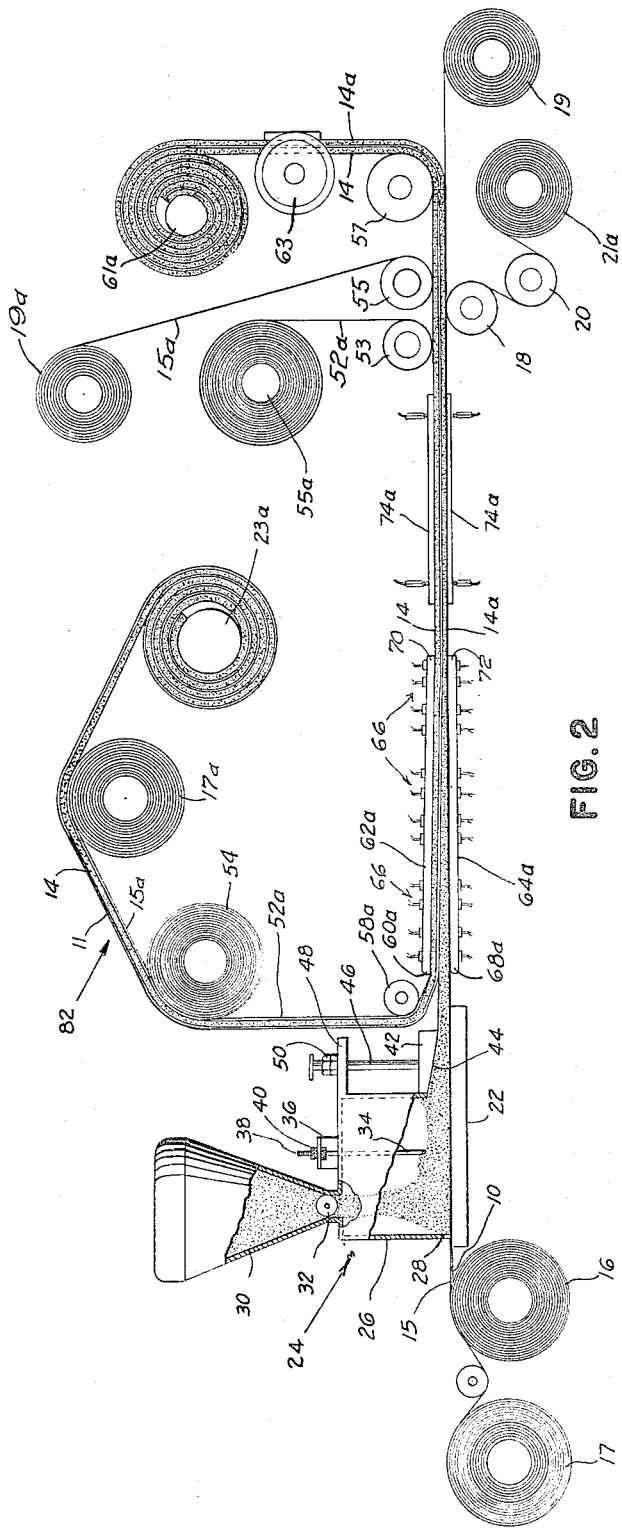
FIG. 2 is a similar view illustrating another step in the manufacture of a composite sheet in accordance with the present invention.

In general the present invention contemplates an improvement in the manufacture of porous sheet materials whereby a composite sheet including a core sheet, such as a sheet of reinforcing or interlining material, may be provided with a permeable porous plastic structure on each side. Such a composite sheet may be used with advantage in prelined shoe uppers, lined garments and the like where two porous plastic surfaces with a reinforcing or interlining area are desired.

In practicing the invention illustrated and described in the Yarrison Patent No. 3,067,469, above referred to, granules of a thermoplastic resin are deposited as a uniform layer on the surface of a resilient porous fibrous carrier sheet, and a second resiliently compressible fibrous carrier sheet is laid down on the resin particle layer. This assembly is then passed between heated plates defining a passageway of diminishing thickness, the plates being heated to a temperature which will supply heat through the fibrous carrier sheets to raise the resin particles of the layer to sintering temperature within the time required for a given portion of the assembly to pass between the heated plates. The heated plates are spaced a distance apart at the entry corresponding substantially to the thickness of the assembly before heating and are spaced at the exit at a distance less than that at the entry to supply heat and pressure to sinter together the resin particles.

It appears tha the reduction in rate, of heat supplied to the particles of resin by reason of the insulating character of the fibrous carrier sheets of the assembly prevents the sharp temperature differential which would exist between the temperature of resin particles in contact with a heated metal surface and the temperature of resin particles spaced from the metal surface. Thus, the particles in the resin layer are more nearly uniform in temperature so that sintering pressure forms a strong uniformly sintered sheet. Also, because the surface granules are not overheated and because of the yielding nature of the fibrous sheet, the surface granules are not flattened out and, hence, there is preserved a greater degree of porosity at the surface of the sintered resin sheet.

In accordance with the present invention a sheet of reinforcing or interlining core material which may comprise a fabric or fibrous material is laid down on the particle layer prior to laying down the upper carrier sheet to dispose the core material intermediate the particle layer and the upper carrier sheet. This assembly of lower carrier sheet, particle layer, core sheet and upper carrier sheet is then passed between the heated plates to effect sintering of the thermoplastic resin and bonding of the core sheet to the upper surface of the sintered plastic material. After subsequent cooling of the assembly and stripping of the upper and lower carrier sheets the resultant composite material is then inverted and run through the apparatus a second time with the core sheet side laid down on top of a second layer of thermoplastic resin granules and with the assembly encased between the upper and lower fibrous carrier sheets. This procedure effects bonding of a layer of sintered plastic material to the other side of the core material, the assembly being then cooled and the upper and lower carrier sheets stripped therefrom to produce the composite structure shown in FIGS. 3 and 4.

In practicing the present invention it has been found that the expedient of passing the first formed porous plastic layer through the apparatus a second time while performing the sintering of the second layer does not harm the permeability or porosity of the first formed layer. However, in practice, it is preferred to increase the speed of the assembly through the apparatus during the first run so that the sintered layer will reach only up to 60% to 75% of the final density of the finished product, and to lower the speed of the assembly through the apparatus during the second run to bring the sintered product up to normal density.

The permeable reinforcing or interlining core material may be knit, woven or non-woven fabric, or paper, and in order to improve the bonding operation the core material may be pretreated with adhesive on its engaging surfaces. The bonding agent may comprise a deposit of resinous material which will permit passage of water vapor and/or air between the microporous sheets and the core member. The type of adhesive and the manner of applying the same may comprise that described in Patent No. 3,067,469 above referred to.

In accordance with another feature of the present invention the outer surfaces of the porous plastic layers of the composite sheet may be provided with a surface design during the manufacture thereof by the interposition of an embossing sheet between either or both carrier sheets and the thermoplastic resin during the second run of the material through the apparatus.

Fibrous carrier sheets useful herein include porous resiliently compressible fiberboards, particularly rubber and/or resin impregnated fiberboards, woven fabrics, and non-woven fabrics. It is important that the fibrous carrier sheets be of substantial strength and firmness. It is further important that they be resistant to distortion under the temperature and pressure conditions encountered in sintering the plastic granules. Commercially available synthetic rubber impregnated fibrous sheet material of the kind used for inexpensive insoles, suitably from about .02 to about .06 inches in thickness has been found very satisfactory.

Referring now to the drawings, the preferred apparatus for practicing the present invention may be similar to that shown in the Yarrison patent, above referred to, with various modifications as will be hereinafter described. The form of the apparatus shown in FIG. 1 is arranged to bond a core sheet 11 to the upper surface of the porous plastic layer 14. A carrier sheet 10 is withdrawn from a roll 16 thereof and is pulled through successive stations by the driven "S" rolls 18, 20 and onto a rewind roll 21 at the end of the sintering operation. From roll 16 the superimposed sheet 10 first passes over a rigid table 22 beneath a plastic granule spreading and initial compaction device 24. The device shown comprises an open bottomed box 26 of which the lower edges of the sides are joined to the table, and the lower edge 28 of the entering end of the box is spaced from the table 22 to provide clearance for passage of the carrier sheet 10. A hopper 30 containing the plastic granules is mounted at the top of the box 26 and is fitted at its lower end with a feeder 32 which passes platsic granules at a controllable rate into the box 26 and onto the moving carrier sheet 10 in the box 26. The granules on the carrier sheet are carried forward by the sheet and are spread in an even layer at a desired thickness by the blade 34 which is supported by the bracket 36 and is adjustable vertically by the threaded rod 38 and knurled nut 40. The blade 34 is adjusted to control the thickness of the layer of granules carried past it, and the feeder 32 is operated to maintain a small accumulation of granules before the plate 34 to insure that the carrier sheet 10 is uniformly covered with granules to the desired depth. The thickness of the layer of the granules passing the blade 34 is controlled to insure maintenance of a small accumulation of plastic granules at the exit end of the box 26 before the initial compaction.

Thermoplastic resins suitable for use in the present method may comprise those disclosed in the Yarrison patent, above referred to, and to which reference may be made. The layer of resin granules is carried by the carrier sheet 10 beneath the uniforming and initial compaction member 42 extending across the exit end of the box. This uniforming and compaction member is a rigid metal member having a smooth lower face 44 extending at a slight angle, which may be of the order of 10° to the carrier sheet 10 to define with the carrier sheet a path of diminishing cross section. The lower face 44 may be, for example but not by way of limitation, 2" wide so that the edge adjacent the box is 0.442" further from the carrier sheet than is the opposite edge. Depending on the spacing of the face 44 from the carrier sheet, the thickness of the layer of granules may be from 3 to 8 times as great at the edge adjacent the box 26 as at the opposite end. The reduction in thickness is due largely to reduction in the amount of resin carried past the member; but the layer of granules is somewhat compacted, and any voids in the layer are filled in in passing beneath the compaction member 42. The uniforming and initial compaction member 42 is carried by the rod 46 which is adjustable heightwise in the bracket 48 by means of adjusting nuts 50. The uniforming and initial compaction member 42 is adjusted to spread the granules in a layer containing from about 0.05 to about 1.5 pounds of resin per square foot of carrier sheet, preferably from 0.06 to 0.20 pounds per square foot.

The core sheet 11 to be bonded to the upper surface of the porous plastic layer 14 is withdrawn from a roll 23, passes over guide roll 56, upper carrier sheet roll 54 and guide roll 58 and is brought down against the upper surface of the layer of resin granules by the rounded leading edge 60 of the plate 62. Simultaneously therewith, the upper carrier sheet 52 is withdrawn from the roll 54 and passes over guide roll 58 and under the plate 62 on top of the core sheet 11. The assembly of lower carrier sheet 10, plastic granules 12, core sheet 11 and upper carrier sheet 52 passes between the plates 62, 64 which are heated to from about 300° to about 400° F. by the electrical heating units 66 to supply the heat required to sinter the plastic granules. The plate 62 is spaced from the lower plate 64 at their leading ends 60 and 68 an amount greater than the spacing of the plates at the trailing ends 70 and 72 to reduce the thickness of the layer of plastic granules to provide a ratio of initial thickness to final thickness in the range of from about 4:1 to about 2:1. The greater the percentage compaction, the greater the increase in density and the lower the porosity.

Heat from the heated plates 62 and 64 must pass through the upper and lower carrier sheets 52 and 10 and through core sheet 11 before raising the temperature of the plastic granules to sinter them under the applied pressure into a microporous layer. Because the rate of heat transmission through the lower and upper fibrous carrier sheets and the core sheet is comparable to the rate of heat transfer in the granule layer, there is no localized overheating of the granules at the boundary between the sheets and the surfaces of the granule layer. Likewise, the sheets are somewhat compressible, as contrasted to metal surfaces. These factors cooperate to prevent excessive flattening and spreading of the granules on the surfaces of the layer of plastic granules so that the porosity and permeability of the surfaces of the plastic layer is preserved.

The length of the heated plates 62 and 64 used will depend on the rate of movement of the assembly, the temperature of the plates, the thickness of the resin layer, the thickness of the carrier sheet 10, carrier sheet 52 and core sheet 11 and the sintering temperature of the resin. It will be unedrstood that as hereinbefore stated the rate of movement of the assembly between the heated plates is increased when applying the first layer of porous plastic material to the core member so that the sintered layer will not reach its full density during this first run.

The core sheet 11 may and preferably will be coated with a suitable adhesive of the type as hereinbefore described to effect firm bonding of the core sheet to the sintered resin layer without destroying the permeable porous characteristics of the plastic layer 14.

After passing between the heated plates 62, 64, the assembly is then cooled. For example, but not by way of limitation, the cooling may be done by passing the assembly between cold plates 74 spaced apart a distance corresponding to the thickness of the assembly. After the cooling operation the lower carrier sheet 10 is stripped from the assembly by the "S" rolls 18, 20 and the rewinding roll 21. The upper carrier sheet 52 is also stripped from the assembly by passing around guide roll 53 and onto driven rewinding roll 55. The composite structure comprising the porous plastic layer having a core sheet bonded to one face thereof passes around guide roll 57 and onto driven winding roll 61.

The composite structure thus produced during the first run is then passed through the apparatus a second time, as illustrated in FIG. 2, wherein a porous plastic layer 14a is bonded to the other side of the core sheet 11, and simultaneously therewith, an embossed design 13a is applied to the outer surface of the layer 14a. The apparatus is substantially the same as that shown in FIG. 1 except that the roll 23a now mounts the partially completed product and, of course, the heated plate 62a, 64a and cooling plates 74a are spaced apart to accommodate the greater thickness of the new assembly. Thus in operation, the new layer of resin particles is deposited on the embossing sheet 15 drawn from roll 17, is laid on top of the lower carrier sheet 10, and the partially prepared composite sheet indicated by the numeral 82 is unwound from the roll 23a and is advanced with the upper carrier sheet 52a under the guide roll 58a and is brought down against the upper surface of the new layer of resin granules by the rounded leading edge 60a of the plate 62a. The assembly then passes between the heated plates 62a, 64a at a normal rate of speed, which is slower than the passage of the first run assembly to effect sintering of the new layer of plastic granules to the other side of the core sheet 11 and to bring the first applied upper layer 14 up to its full sintered density.

After passing through the heated plates 62a, 64a during the second run the assembly is cooled, for example, by passage thereof between the water cooled plates 74a, and thereafter the upper and lower carrier sheets are stripped from the assembly by the rewinding rolls 21a, 55a, and the embossing sheet 15 is likewise stripped from the assembly by rewinding roll 19. The composite structure comprising the core sheet 11 having a porous plastic layer 14, 14a bonded to opposed faces thereof, layer 14a being provided with an embossed surface, is then wound onto a driven roll 61a. During such passage the edges of the composite structure may be trimmed by driven rotary knives 63 as indicated in FIG. 2. It will be evident that the apparatus may be modified to produce a composite sheet having a core member 11 and porous plastic layers 14, 14a without embossed surfaces, as shown in FIG. 4, by merely eliminating the embossing sheet in the above-described apparatus for practicing the present method. The composite sheet may be embossed on both sides during the second run by providing an upper embossing sheet 15a drawn from roll 17a. The embossing sheet 15a is positioned against the porous plastic layer 14 and passes over upper carrier roll 54 and roll 58a and through plates 62a, 64a, 74a, 74a and is rewound on roll 19a. The upper carrier sheet 52a also passes around roll 58a and through the apparatus to be rewound on roll 55a in the same manner as during the first passage through the apparatus. Thus, a composite sheet, as shown in FIG. 3, having embossed designs 13, 13a may be produced.

From the above description of the apparatus for practicing the present invention it will be seen that a layer of porous plastic may be bonded to both sides of a core sheet in a simple and efficient manner without harming the permeability or porosity of the first layer during the second run through the apparatus. In practice the two layers of porous plastic may be of different colors and may have different surface textures, "feel" and design. The plastic layers may also be modified to make them either water-repellent, water absorptive on both or on different sides, or the layers may have characteristics intermediate the two extremes.

While the preferred embodiment of the invention has been herein illustrated and described, it will be understood that the invention may be embodied in other forms within the scope of the following claims.

Having thus defined the invention, what is claimed is:

1. The method of manufacturing a porous permeable composite sheet which comprises the steps of: depositing a layer of thermoplastic resin granules on a carrier, applying a permeable core sheet to said layer, partially sintering said assembly, then applying on the other side of said core sheet a second layer of granules supported on a second carrier and sintering the assembly to provide a porous permeable composite sheet.

2. The method as defined in claim 1 which includes the step of interposing an embossing sheet between at least one of the carrier sheets and the resin layer to impress the embossed design on the outer surface of the resin layer during the second passage of the assembly between said heated plates.

3. The method as defined in claim 1 which includes cooling the second assembly, and stripping the carrier sheets from the same.

4. The method as defined in claim 3 wherein said first assembly is passed between the heated plates at an increased rate of speed to bring the first sintered layer to only 60% to 75% of its full density, and wherein the second assembly is passed between the heated plates at a normal rate to effect sintering of both layers to their fully sintered density.

5. The method as defined in claim 3 wherein the core sheet is treated with adhesive to effect bonding of the sheet to the sintered plastic layers.

6. The method of manufacturing a composite sheet including a flexible core sheet having a microporous permeable layer of resin on each side thereof which comprises the steps of spreading granular thermoplastic resin in a uniform layer on a lower resiliently compressible fibrous carrier sheet, laying down on the exposed surface of said layer a flexible permeable core sheet and an upper resiliently compressible fibrous carrier sheet, passing the resultant assembly between heated plates defining a passageway diminishing in thickness, said heated plates supplying heat and pressure to portions of said assembly passing therethrough to partially sinter the resin granules together in a microporous layer and to simultaneously bond the core sheet to the layer, cooling the assembly and stripping the fibrous carrier sheets therefrom, inverting the resultant product and passing the same through the heated plates a second time with the core sheet laid on top of a second uniform layer of resin granules and enveloped between upper and lower fibrous carrier sheets providing a second assembly whereby the second layer is bonded to the other side of the core sheet.

References Cited by the Examiner

UNITED STATES PATENTS

| | | | |
|---|---|---|---|
| 2,287,159 | 6/1942 | Zinser | 161—73 |
| 2,404,073 | 7/1946 | Karfiol et al. | 156—209 |
| 2,543,101 | 2/1951 | Francis. | |
| 2,621,138 | 12/1952 | Messing | 156—209 |
| 3,067,469 | 12/1962 | Yarrison | 264—112 |
| 3,093,525 | 6/1963 | Wilson et al. | 156—79 |

FOREIGN PATENTS

| | | |
|---|---|---|
| 333,161 | 8/1930 | Great Britain. |

EARL M. BERGERT, *Primary Examiner.*

H. F. EPSTEIN, *Assistant Examiner.*